Nov. 13, 1962 I. M. WILBUR ET AL 3,064,203

RIPPLE BALANCING SYSTEM

Filed Jan. 23, 1961

INVENTORS
IRVIN M. WILBUR.
HERBERT H. LENK.
BY Alden D. Redfield
Irvin P. Garfinkle
ATTORNEYS.

United States Patent Office 3,064,203
Patented Nov. 13, 1962

3,064,203
RIPPLE BALANCING SYSTEM
Irvin M. Wilbur and Herbert H. Lenk, Cincinnati, Ohio
Filed Jan. 23, 1961, Ser. No. 84,462
2 Claims. (Cl. 330—40)

This invention relates generally to circuitry for the reduction by cancellation of supply line noises in the signal output of an electronic amplifier. This can apply to single or multiple stage amplifiers.

In low signal level alternating current amplifiers which are connected to a direct current supply fortuitously containing alternating current components, such as ripple or noise, the noise or ripple appearing at the output terminals of the amplifier may be large enough to be comparable to the signal and, therefore, is very objectionable. In the prior art, such unwanted alternating current components appearing in the direct current supply line are eliminated by means of filters or bridge networks in the amplifier input circuits; however, where an R-C filter is employed, a larger supply voltage is required, and where an L-C filter or bridge network is employed, considerable bulkiness and weight are added to the apparatus. With either type of filter, considerable expense is added to the cost of the amplifier.

Our invention uses the natural amplifier characteristics and parameters to cancel out at the amplifier output load unwanted alternating current components such as line pickup and ripple.

The primary object of this invention is to provide an amplifier system from which unwanted alternating current components appearing in the direct current supply line are cancelled without the use of complex circuitry and without substantially degrading amplifier performance.

Another object of this invention is to provide a network for equalizing and cancelling objectionable line noise from the output terminals of a transistor amplifier.

Still another object of this invention is to bias the electrodes of an alternating current amplifier from a direct current supply having ripple or noise components and to cancel said ripple and noise components by connecting the input and output circuits of the amplifier in a network whereby the ripple voltages applied to the input circuit are amplified and phase shifted to cancel the ripple voltages applied across the output circuit.

Figure 1:
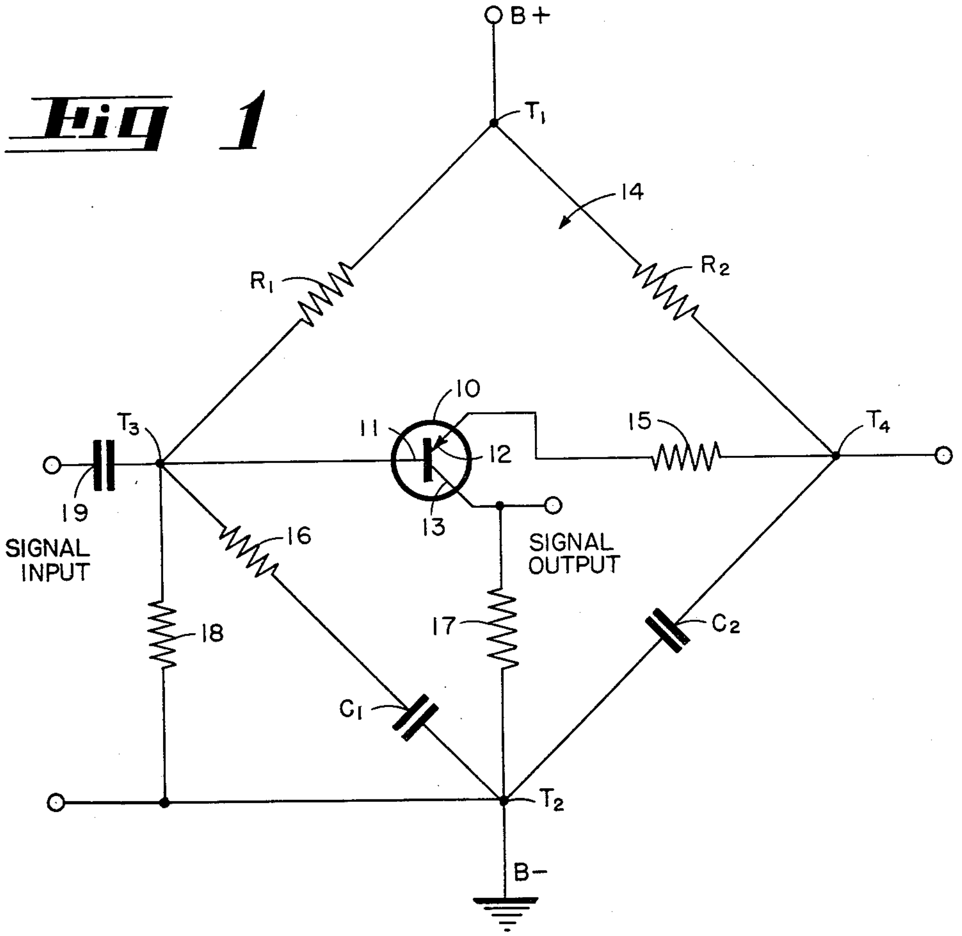
Figure 2:
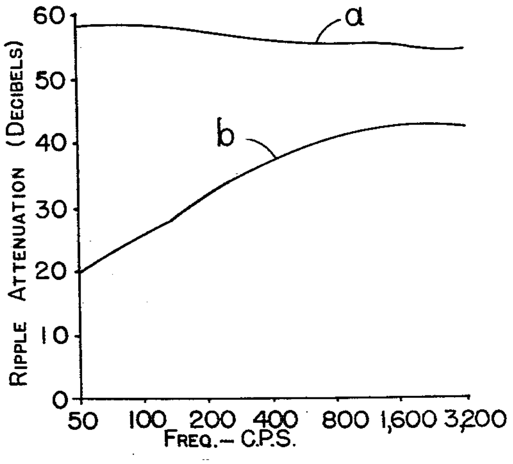

For a more complete understanding of the nature and further objects of this invention, reference should now be made to the following detailed description and to the accompanying drawings, in which FIG. 1 is a schematic diagram illustrating a preferred form of our invention; and FIG. 2 is a series of curves comparing the performance of amplifiers made in accordance with our invention with those of the prior art.

The circuit of FIG. 1 is arranged for efficiently operating an alternating current transistor amplifier 10 and at the same time preventing ripple voltage components of a direct current supply line from appearing across the transistor output terminals. The transistor amplifier 10 is shown as a PNP, junction-type transistor having a base 11, an emitter 12 and a collector 13. It is understood, of course, that NPN-type transistors may equally well be employed by suitable alterations to the circuitry.

Cancellation of noise and ripple supply line voltage is accomplished without degrading the amplifier operation by uniquely connecting the transistor 10 into a network generally indicated at 14. The network 14 is provided with four terminals $T_1$–$T_4$, the direct current supply line being connected across the terminals $T_1$ and $T_2$, while the transistor base-emitter input circuit, including the base 11, the emitter 12 and the resistor 15, is connected across the terminals $T_3$ and $T_4$.

The network 14 comprises four branches, including two resistors $R_1$ and $R_2$, and two condensers $C_1$ and $C_2$, a small resistor 16 being connected in series with condenser $C_1$. The collector of transistor 10 is operatively biased by connection to the B— terminal of the direct current supply line through the terminal $T_2$ and a load resistor 17. Alternating current input signals are applied through a condenser 19 across the base-emitter junction of transistor 10. Signal output is derived from across the load resistor 17, and it is at this point that we seek to eliminate unwanted ripple and noise voltages.

It will be noted that the power supply between B+ and B— is connected across the input and output circuits of the transistor 10 through several paths. A first direct current path through the base-emitter input circuit is from the B+ supply through the resistor $R_2$, the resistor 15, the emitter-base junction and the resistor 18 to ground. A second direct current path is established through the output circuit from B+ through resistor $R_2$, resistor 15, the emitter-collector junction and load resistor 17 to ground. Note also, that an alternating current shunt path for the input circuit is established by means of resistor 16 and condenser $C_1$, while an alternating current path is established on the output circuit by condenser $C_2$.

In establishing circuit parameters, the resistors 17, 15, and $R_2$ are selected for direct current biasing of the emitter and collector electrodes compatible with the required operating load impedances, while resistors $R_1$ and 18 are selected for establishing a proper voltage bias on the base, compatible with required transistor temperature stability. With these direct current operating characteristics established, the voltage gain of transistor 10 may then be determined.

As previously noted, the first path from the B+ supply to ground is through the base-emitter junction of transistor 10. It will be recognized that voltages applied across the base-emitter junction of any transistor will appear in amplified form at the collector, but 180° out of phase. Therefore, ripple voltages of the power supply which are impressed across the base-emitter junction of the transistor 10 will appear in amplified form in the collector circuit, but 180° out of phase.

It was also noted previously that the second path from the B+ supply to ground was directly through the collector-emitter junction, and ripple voltages from the power supply are applied directly across the load resistor 17. It will be seen that the voltages resulting from the direct application of the ripple via the second path are 180° out of phase with the voltages appearing across the load resistor 17 as a result of amplification of the ripple voltages applied to the base-emitter junction. Therefore, there will be a tendency for these two voltages to cancel.

By making a proper division of the ripple voltage components impressed across the base-emitter junctions and the emitter-collector junctions, we are able to make these two voltages across the load resistor 17 equal in amplitude and opposite in phase and thereby cancel. Since the gain of the transistor 10 is known or can be determined, the ratio of ripple voltage applied to the base-emitter junction to the ripple voltage applied across the collector-emitter junction is established at $$\frac{1}{\text{gain}}$$

This is accomplished by means of the alternating current shunt which includes condenser $C_1$ and resistor 16, which provides the proper order of magnitude for the ripple applied in the input circuit. Phase opposition is maintained by means of the condenser $C_2$ which provides a degenerative phase correction for maintaining the two voltages 180° out of phase.

It is understood, of course, that the over-all impedance values include stray capacitances and the dynamic capacity of the transistor. In fact, depending on frequency of operation, the dynamic capacity of the transistor may fulfill the entire capacitance requirements in some applications.

Base-collector bias is provided by a proper voltage division accomplished by resistors $R_1$, 17, and 18; emitter-collector bias is developed from the B+ and B− terminals of the direct current supply through the resistors $R_2$, 15, and 17; and signal amplification is achieved by application of signals across resistor 18, which is connected across the base-emitter electrodes through condenser $C_2$ and resistor 15. Condensers $C_1$ and $C_2$ are first chosen for values which will satisfy the frequency response characteristics required, taking into account the inherent capacity of the transistor and that of the associated circuitry. In this way the signal voltages are properly amplified, while the other unwanted alternating voltages are eliminated by cancellation in the output circuit. It will be seen that the entire action of the system rests with the proper division, application and amplification of spurious supply line noise signals to automatically produce two components of these signals in the amplifier signal output which are essentially equal in amplitude and opposite in phase.

While the particular circuit values do not form a part of this invention, the following parameters were used in apparatus which was successfully reduced to practice, and they are listed as an aid to persons skilled in the art who desire to use this invention.

| | |
|---|---|
| Resistors: | |
| $R_1$ | 240K ohms. |
| $R_2$ | 10K ohms. |
| **15** | 220 ohms. |
| **16** | 330 ohms. |
| **17** | 10K ohms. |
| **18** | 330K ohms. |
| Condensers: | |
| $C_1$ | .5 $\mu$f. |
| $C_2$ | 12 $\mu$f. |
| **19** | 2 $\mu$f. |
| Transistor **10** | 2N43. |

The foregoing parameters found utility in a de-emphasis stage (audio amplifier) used in a frequency-modulated signal receiver. The 220 ohm resistor 15 in series with the emitter 12 was employed to provide feedback and to raise the input impedance to about 15K ohms, while the network of $R_2$ and the 12 $\mu$f. condenser $C_2$ temporizes the feedback as the frequency increases. The base-ground network, including the 330 ohm resistor 16 and the .5 $\mu$f. condenser $C_1$, provided increasing attenuation of audio frequency input signals up to about 1 kc. It was found that the ripple cancellation was unaffected by the small resistor 16 at low frequencies, but some unbalance occurred at frequencies above 1 kc. This condition was not too serious, since the ratio of ripple in the branch between terminals $T_2$ and $T_3$ becomes a smaller fraction of the total ripple as the signal frequency increases. The only disadvantage of the circuit was that the impedance values required for the resistors $R_1$ and 18 to obtain a proper direct current bias for the base 11 resulted in less temperature stability, and this might require the use of a more temperature-stable transistor for certain applications.

The curves in FIG. 2 compare the performance of an amplifier using this invention with that of a prior art amplifier. With a ripple voltage impressed across the power supply terminals $T_1$ and $T_2$, it was found that with our invention ripple voltages at the load were attenuated as shown in curve *a*. On the other hand, as represented in curve *b*, a much lesser amount of attenuation of ripple voltages was measured with unbalanced prior art amplifiers. Comparison of curves *a* and *b* indicates the degree of improvement resulting from our invention.

Many modifications and adaptations of this invention will readily become apparent to persons skilled in the art. For example, while the embodiment illustrated employs a common emitter configuration, a transistor connected common collector or common base may also be used by suitable circuit adjustments. In addition, it is clear that the invention is equally applicable to vacuum tubes and any other type voltage amplifier. Moreover, the branches of the network may be entirely resistive or reactive, and for wide ranges of frequency, inductive and capacitive parameters may be used depending upon the particular circuit application. For this reason it is intended that our invention be limited only by the following claims, as read in the light of the prior art.

What is claimed is:

1. In a common emitter transistor stage of the type comprising a transistor having a base and an emitter and a collector, a power supply having two terminals, a voltage divider across said terminals having first and second series resistors and a connection between their junction and said base, a collector load resistor between said collector and one of said terminals and resistance between said emitter and the other of said terminals, the improvement which comprises a capacitor between a point on the last-mentioned resistance and said one terminal and a resistance-capacitance shunt network between said connection to the base and said one terminal.

2. In a common emitter transistor stage of the type comprising a PNP transistor having a base and an emitter and a collector, a power supply having positive and negative terminals, a voltage divider across said terminals having first and second series resistors and a connection between their junction and said base, a collector load resistor between said collector and the negative terminal and resistance between said emitter and the positive terminal, the improvement which comprises a capacitor between a point on the last-mentioned resistance and said negative terminal and a resistance-capacitance shunt network between said connection to the base and said negative terminal.

References Cited in the file of this patent

UNITED STATES PATENTS

| | | |
|---|---|---|
| 1,959,482 | Lofgren | May 22, 1934 |
| 2,313,097 | Shepard | Mar. 9, 1943 |
| 2,374,071 | Barton | Apr. 17, 1945 |
| 2,609,442 | Hester | Sept. 2, 1952 |